(12) United States Patent
Masterson et al.

(10) Patent No.: US 8,488,679 B1
(45) Date of Patent: *Jul. 16, 2013

(54) STREAMLINED TRANSCODER ARCHITECTURE

(75) Inventors: Anthony D. Masterson, Saratoga, CA (US); Dzung T. Hoang, Austin, TX (US); Alexander N. Kipnis, Mountain View, CA (US)

(73) Assignee: Zenverge, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,522

(22) Filed: Sep. 11, 2012

Related U.S. Application Data

(63) Continuation of application No. 11/567,678, filed on Dec. 6, 2006, now Pat. No. 8,311,114.

(51) Int. Cl.
*H04N 7/36* (2006.01)
(52) U.S. Cl.
USPC .................. 375/240.16; 375/240.12
(58) Field of Classification Search
USPC ....................... 375/240.12, 240.16
See application file for complete search history.

(56) References Cited

U.S. PATENT DOCUMENTS 5,544,266 A * 8/1996 Koppelmans et al. ........ 382/238
8,085,846 B2 12/2011 Tourapis et al.

OTHER PUBLICATIONS

United States Patent and Trademark Office, Non-Final Rejection, U.S. Appl. No. 12/898,591, Dec. 10, 2012, 18 Pages.

* cited by examiner

*Primary Examiner* — Sath V Perungavoor
*Assistant Examiner* — Jeffery Williams
(74) *Attorney, Agent, or Firm* — Fenwick & West LLP

(57) ABSTRACT

Systems and methods for a streamlined transcoder architecture. A transcoder system includes an encoder and a decoder. The encoder compares a decoded frame and a encoder reference frame to produce an output stream. The decoder produces the decoded frame including decoder reference frame and the encoder reference frame. The decoded frame is produced from an input stream, and the encoder reference frame is produced from the output stream of the encoder. In one embodiment, the encoder refines motion vectors, quantization, and macroblock type/mode from the input stream for reuse in the output stream. Furthermore, the decoded frames from the input stream can be modified in various ways including changing picture resolution and performing image enhancement on them before encoding.

20 Claims, 4 Drawing Sheets

STREAMLINED TRANSCODER ARCHITECTURE

CROSS-REFERENCE TO RELATED APPLICATION

This application is a continuation under 35 U.S.C. §120 of co-pending U.S. patent application Ser. No. 11/567,678, entitled "Streamlined Transcoder Architecture," filed on Dec. 6, 2006, which is incorporated by reference herein in its entirety.

FIELD OF THE INVENTION

The present invention relates generally to media processing, and more specifically, to transcoding of media streams.

BACKGROUND

Conventionally, multimedia such as video and audio has been delivered using analog delivery mediums such as NTSC (National Television System Committee) signals, and has been stored using analog storage mediums such as video cassette recorders. The analog signals typically contain uncompressed frames of video. Thus, a significant part of the electronic components in a display device are dedicated to analog receiving hardware, and if the display device has a digital output, electronic components are needed to convert the analog signal to a digital signal. With the advent of digital delivery mediums, such as ATSC (Advanced Television Systems Committee) signals, and of digital storage mediums and DVDs, multimedia can be delivered and stored using pure digital signals. Digital signals typically contain compressed frames of video.

Meanwhile, consumers and business have an increasing number of digital playback devices such as high-definition televisions, digital video recorders, MP3 players and the like. However, the digital playback devices are typically incompatible with each other in ways such as compression format, resolution, and encryption. Furthermore, the digital playback devices are likely to use a digital format that is optimized for particular storage and playback capabilities. For example, a high-definition television can display a conventional high-definition signal, but a standard-definition television or a portable video player typically can only display a standard-definition digital signal with different characteristics. Differences in digital formats can include encoding, bit rate, resolution, and the like.

Due to differences in conventional playback devices, there are limits in the types of digital formats that can be read or written by the devices. In order to handle more digital formats, the complexity of related hardware increases dramatically. One reason for this is that the digital formats are typically decompressed in order to perform operations in the spatial domain to make use of legacy analog techniques which operate on decompressed video. Decompressed multimedia, especially video, requires high-performance processing hardware to handle the high bandwidth for data transfers. Decompressed video also requires significant amounts of storage.

A particular need in digital media applications involves changing media from a first compression format into a second compression format. Such a need may arise, for example, when a digital media broadcast feed is in a format that is not compatible with a certain playback system. The need to change digital media formats is becoming increasingly pervasive as more digital broadcast, distribution, storage, processing, and playback systems are brought into use.

Traditional approaches to transcoding have involved the implementation of a complete decoder that is separate from a complete encoder. Because decoders and encoders are sophisticated components that are difficult to design, the encoder and the decoder are typically designed separately, with interaction between the two limited to the uncompressed video frames. Referring to FIG. 1, a decoder design 101 is responsible for decoding one or more motion vectors 106, an error term 108, and a variety of the compression parameters including quantization, macroblock type/mode, etc. to produce a decoded frame 110. A separate and independent encoder design 103 is responsible for encoding the decoded frame 110 to produce an error term 114, one or more motion vectors 116 and a variety of the compression parameters including quantization, macroblock type/mode, etc.

From time-to-time, a frame will be received without interframe compression—such frames are used to directly establish or refresh the reference frame 112. For frames having interframe compression, one or more motion vectors 106, an error term 108, and a variety of the compression parameters including quantization, macroblock type/mode, etc. describe the currently decoded frame with reference to a previously decoded or received frame, the reference frame 112. The decoder 102 applies the motion vectors 106 to the reference frame 112, adds the error term 108, and applies a variety of other compression parameters including quantization, macroblock type/mode, etc., to the resulting macroblock to produce a decoded frame 110. The decoded frame 110 is stored for future use in the decoder as a reference frame 112, and is the output of the decoder design 101.

The decoded frame 110 is the input to the encoder design 103. In the encoder design 103, an encoder 104 compares the decoded frame 110 to a reference frame 120 to produce an error term 114, one or more motion vectors 116, and a variety of the compression parameters including quantization, macroblock type/mode, etc. The error term 114, the motion vectors 116, and a variety of the compression parameters including quantization, macroblock type/mode, etc. are the outputs of the encoder design 103. From time-to-time, a decoded frame 110 will pass through the encoder design 103 without interframe compression, for example, to establish reference frames at the remote receiver's decoder. Such a frame will typically also be stored locally as a reference frame 120 in reference frame storage 122.

The reference frame 120 represents a copy of the expected recently decoded frame at the remote receiver's decoder. The reference frame 120 is used in the encoder design 103 to determine an error term 114, one or more motion vectors 116, and a variety of the compression parameters including quantization, macroblock type/mode, etc. that will produce a frame similar to the decoded frame 110 in the remote receiver's decoder. Typically, the encoder design 103 will include a complete decoder 105, which applies the motion vectors 116 to the reference frame 120 and adds the error term 114 and applies a variety of other compression parameters including quantization, macroblock type/mode, etc., to produce a new reference frame 120. The new reference frame 120 is used for encoding by the encoder 104, and is also used as a reference frame 120 for the decoder 105 to use for decoding of subsequent frames.

Because the decoder design 101 and the encoder design 103 are separate and independent, conventional transcoders are inefficient and costly. Therefore, what is needed is a streamlined transcoder architecture.

SUMMARY

The present invention includes systems and methods for a streamlined transcoder architecture. A unified decoder provides both decoded frames, which includes decoder reference frames, and encoder reference frames to an encoder. Because the same decoder that produces decoded frames also produces encoder reference frames, the power consumption, size, and cost of the transcoder is improved in comparison to architectures using separate decoders for producing decoded frames including decoder reference frames and encoder reference frames.

Advantageously, because the transcoder architecture is streamlined, data present in the decode step is also available in the encode step. In one embodiment, for example, frame information including compression parameters such as motion vectors, quantization, macroblock type/mode selection, etc. received by the transcoder for the purpose of decoding can be reused for the purpose of encoding.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for a streamlined transcoder architecture are described. In one embodiment, an encoder compares a decoded frame and a reference frame to produce an output stream. A decoder produces the decoded frame, which includes decoder reference frames, and the encoder reference frame. The decoded frame is produced from an input stream, and the encoder reference frame is produced from the output stream of the encoder. Because the decoder produces the decoded frame and the encoder reference frame, resource consumption of the transcoder architecture can be advantageously reduced.

As will be apparent to one of ordinary skill in the art, the systems and methods described may also be applied to image or video fields instead of frames and the fields or frames may be interlaced or deinterlaced. Thus, although various embodiments are described within in terms of video or image frames, the techniques may also be applied to video or image fields without departing from the scope of the invention.

Figure 1:
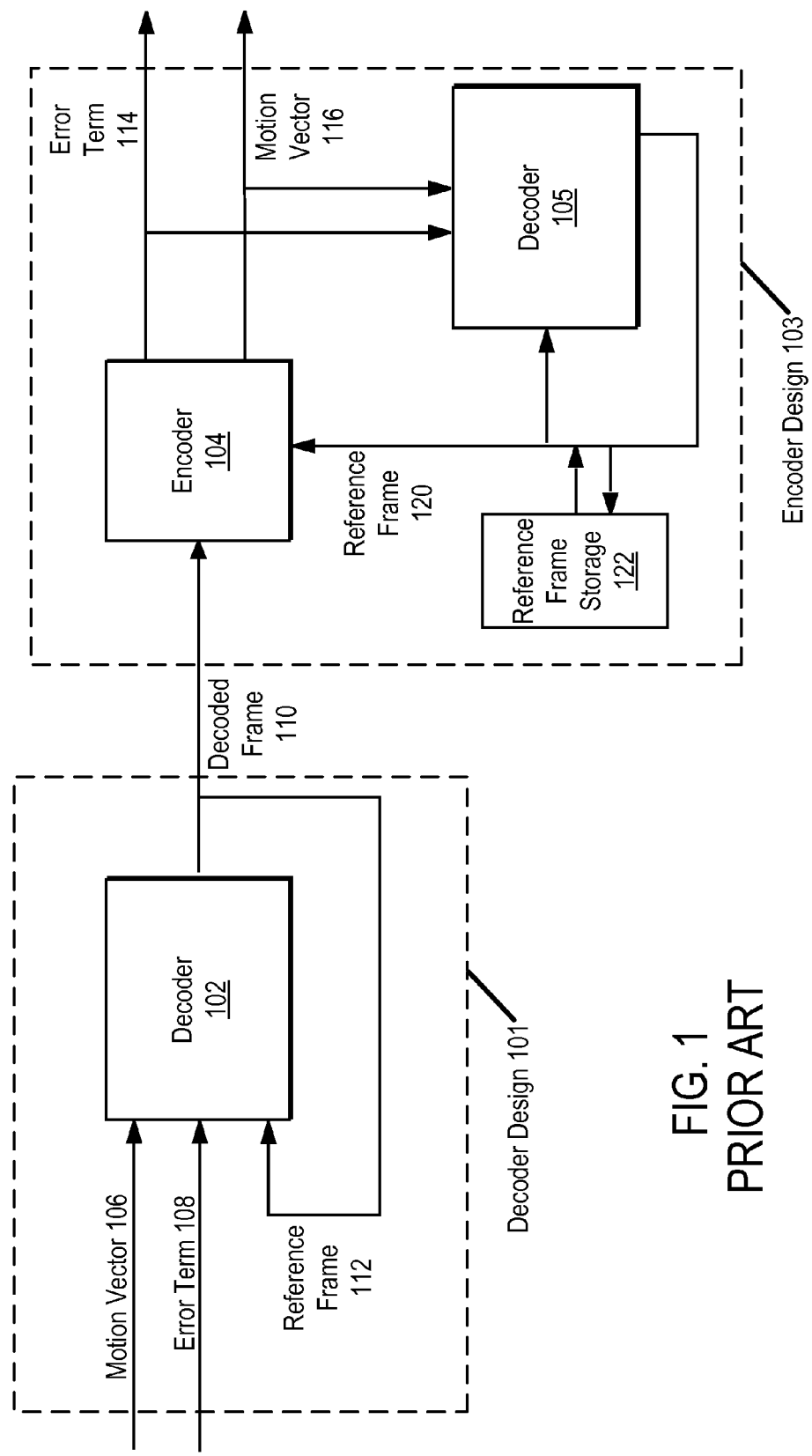
FIG. 1 is a block diagram of a conventional transcoder architecture.

FIG. 1 is a block diagram of a conventional transcoder architecture. As described previously, the conventional transcoder architecture of FIG. 1 includes a decoder design 101 separate from the encoder design 103.

Figure 2:
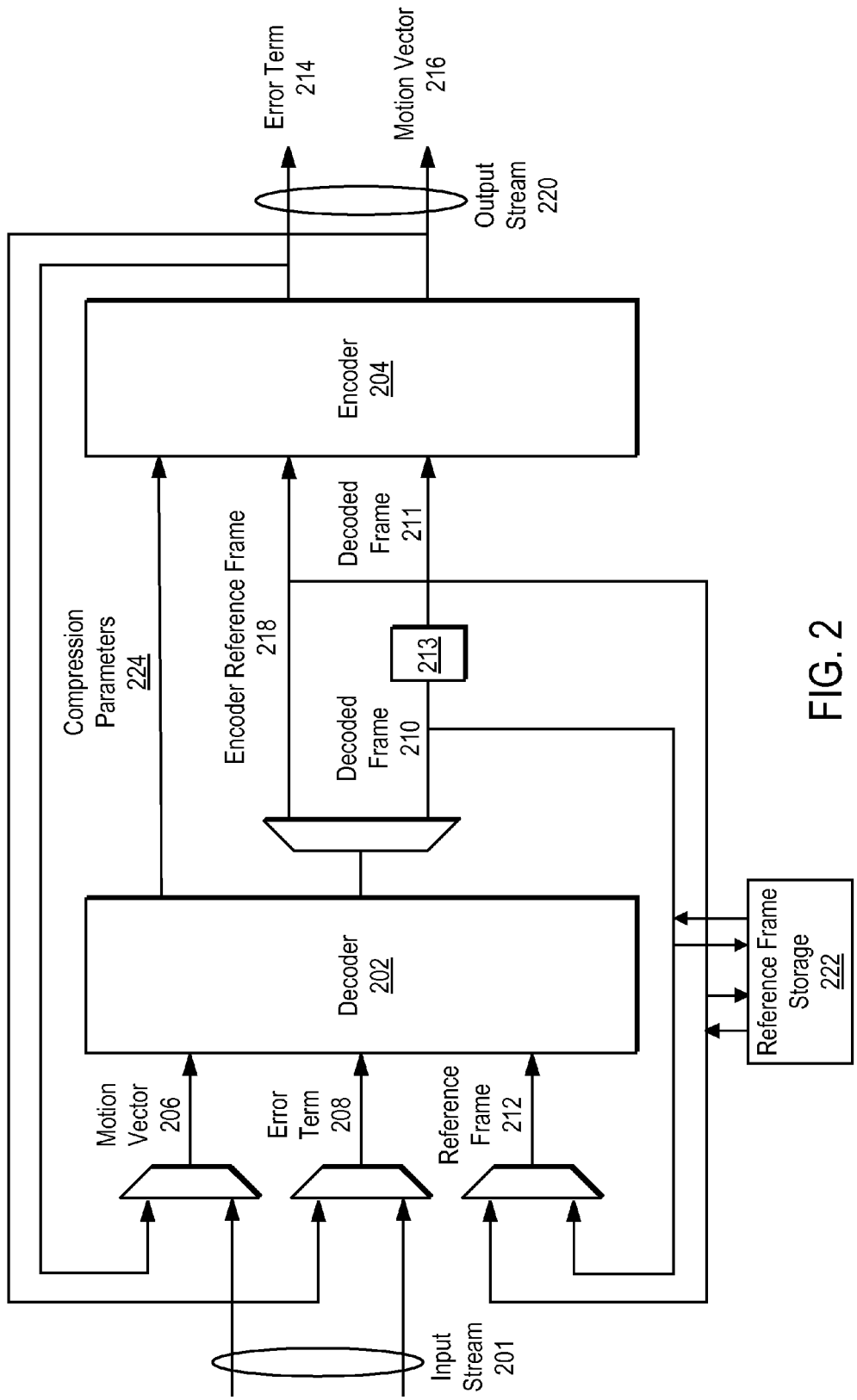
FIG. 2 is a block diagram illustrating a streamlined transcoder architecture, according to one embodiment of the present invention.

FIG. 2 is a block diagram illustrating a streamlined transcoder architecture, according to one embodiment of the present invention. For the purposes of illustration, the streamlined transcoder architecture is described in terms of a system. According to various embodiments of the present invention, a streamlined transcoder architecture can be implemented as hardware, software, an integrated circuit, and so on. Other methods for electronically implementing computational steps will be apparent to one of skill in the art without departing from the scope of the present invention.

The system is adapted to convert a compressed input stream 201 to a compressed output stream 220. The compressed input 201 and output streams 220 can be encoded formatted under various audio/video protocols such as, MPEG-2, MPEG-4, MP3, H.263, H.264, AVS, a RealVideo format, a Windows Media Player format such as VC-1, other video formats, other audio formats, and the like. The formats can vary in characteristics such as bit rate and resolution. The transcoding may involve changes in picture timing, picture dimensions, image enhancement, and the like. As will be apparent to one of skill in the art, media formats discussed herein are intended to be exemplary, and other forms of compressed media and/or data may be used without departing from the scope of the present invention.

From time-to-time, the input stream 201 will include a frame without interframe compression. Such a frame is used as the first decoded frame 210, and provides a boot-strap or refresh for subsequent or prior interframe compression. While the following discussion of transcoding is primarily directed towards the decoding of frames with interframe compression, it will be apparent to one of skill in the art that the input stream of 201 will from time-to-time include frames without interframe compression. Similarly, from time-to-time, the output stream 220 will include a frame without interframe compression. Such a frame is used as the first encoder reference frame 218, and provides a boot-strap or refresh for subsequent interframe compression at a remote receiver. While the following discussion of transcoding is primarily directed towards the encoding of frames with interframe compression, it will be apparent to one of skill in the art that the output stream of 220 will from time-to-time include frames without interframe compression. Advantageously, because the decoder 202 and the encoder 204 are included in the streamlined transcoder architecture, information about frames without interframe compression in the input stream 201 can be usefully employed to produce frames without interframe compression in the output stream 220.

As shown in the figure, a unified decoder 202 produces both decoded frames and encoder reference frames. In one embodiment, the decoder 202 can be usefully understood as operating in one of at least two modes. In a first mode, the decoder 202 functions to produce a decoded frame, which can be a decoder reference frame, 210 from the input stream 201. In a second mode, the decoder 202 functions to produce a encoder reference frame 218 from previous output of the encoder 204. While in one embodiment the decoder 202 transitions between its two modes based on time, other methods for multiplexing a unified decoder 202 will be apparent to one of skill in the art without departing from the scope of the present invention.

In one embodiment, if the encoder reference frame uses motion compensation, the motion compensated reference frame pixel data is passed to the decoder 202 instead of the motion vectors from the encode 204. This saves the bandwidth of another motion compensation fetch.

In another embodiment, the output of the decoder is passed one macroblock at a time directly to the input of the encoder without storing the results to memory for non-reference frames to dramatically boost the transcoder performance.

In the first mode, the decoder 202 receives frame information. In one embodiment the frame information comprises one or more motion vectors 206, and an error or residual term 208 from the input stream 201. In another embodiment, the frame information further comprises compression parameters, such as, for example, a quantization parameter, a macroblock type parameter, a macroblock mode parameter, and a variable number of other parameters based on the compression format. The decoder 202 further uses one or more previous or future decoded frames 210 as a reference frame 212. While not shown in the figure, according to one embodiment of the present invention, the decoder 202 receives reference frames 212 from a repository of previous decoded frames 210. In addition, decoder 202 can perform intraprediction based on input stream 201.

In the first mode, the decoder 202 uses the frame information and one or more reference frames 212 to produce a decoded frame 210. The frame information may include, for example, one or more motion vectors 206, the error term 208, and a variety of the compression parameters including quantization, macroblock type/mode, etc. A method used by the decoder 202 is described herein with reference to FIG. 3. The decoded frame 210 is a frame without interframe compression. According to various embodiments, the decoded frame 210 can be described in either a spatial or a compressed domain.

In the second mode, the decoder receives frame information including, for example, one or more motion vectors 206, an error term 208 from the output of the encoder 204. In one embodiment, frame information from the encoder 204 may further comprise a variety of the compression parameters including quantization, macroblock type/mode, etc. The decoder 202 further uses a previous encoder reference frame 218 as a reference frame 212. According to one embodiment of the present invention, the decoder 202 receives a reference frame 212 from a repository of previous and/or future encoder reference frames 218 that may be stored in a reference frame storage 222.

In the second mode, the decoder 202 uses the motion vectors 206, the error term 208, and the reference frame 212 to produce a encoder reference frame 218. In one embodiment, the decoder further uses a variety of the compression parameters such as quantization, macroblock type/mode, etc. to produce the encoder reference frame 218. A method used by the decoder 202 is described herein with reference to FIG. 3. The encoder reference frame 218 is a frame with no interframe compression. According to various embodiments, the decoded frame 210 can be described in either a spatial or a compressed domain.

In one embodiment, the system further includes an image processor 213. The image processor 213 performs further transformation on the decoded frame 210 to produce a decoded frame 211. For example, the image processor 213 can be configured to change the size, characteristics, or sampling rate of the decoded frame 210, or to perform image enhancement or other modifications on the decoded frame 210. The image processor 213 can operate on the decoded frame 210 in a spatial domain, a compressed domain, or both. Other examples of transformation that can be performed by the image processor 213 will be apparent to one of skill in the art without departing from the scope of the present invention. In embodiments in which the image processor 213 is not included, the decoded frame 211 can be equivalent to the decoded frame 210.

The image processor 213 (if present) uses the decoded frame 210 to produce the decoded frame 211. The decoded frame 211 typically represents the desired output of a decoded frame at a remote receiver's decoder. (A remote receiver could be, for example, a recipient of the output stream 220.) The decoder 202 also processes components of the output stream to produce the encoder reference frame 218. The encoder reference frame 218 typically represents the expected output of a previously decoded frame at a remote receiver's decoder. In one embodiment, the encoder 204 uses at least the encoder reference frame 218 and the decoded frame 211 to produce the output stream 220. The output stream 220 describes how a decoded reference frame at the remote receiver's decoder should be modified to produce a frame similar to the decoded frame 211.

In one embodiment, the encoder 204 compares the encoder reference frame 218 to the decoded frame 211 to produce error or residual term 214, macroblock type/mode, quantization factor, and one or more motion vectors 216. A method used by the encoder 204 is described herein with reference to FIG. 4. The output frame information including an error term 214 and the motion vectors 216 are included in the output stream 220. In one embodiment, the output frame information further comprises a variety of the compression parameters including quantization, macroblock type, and macroblock mode included in output stream 220. The output frame information including error term 214, motion vectors 216, and compression parameters are also fed back to the inputs of the decoder 202 for production of future encoder reference frames 218.

The system is configured so that the format and compression method of the input stream 201 can be different from the format and compression method of the output stream 220. The input frame information including the error terms, motion vectors, and compression parameters (such as quantization, macroblock type/mode, etc.) of the input stream 201 may be described differently from the output frame information including the error terms and motion vectors, and compression parameters of the output stream 220. Furthermore, the encoder reference frame 218 and the decoded frame 210 can be of different size, compression ratio, and so on. Because the decoder 202 receives error terms and motion vectors, and a variety of the compression parameters including quantization, macroblock type/mode, etc. of the input stream 201 to produce decoded frames 210, as well as error terms and motion vectors, and a variety of the compression parameters including quantization, macroblock type/mode, etc. of the output stream 220 to produce encoder reference frames 218, the decoder 202 is typically configured to operate on error terms, motion vectors, compression parameters used in a variety of formats. In the first mode, for example, the decoder 202 receives an error term, motion vectors, and a variety of the compression parameters including quantization, macroblock type/mode, etc. of a first format to produce a decoded frame 210, and in the second mode, the decoder 202 receives an error term, motion vectors, and a variety of the compression parameters including quantization, macroblock type/mode, etc. of a second format to produce an encoder reference frame 218. In one embodiment, the decoder 202 is configured to alternate between processing frames of a first format and processing frames of a second format. For example, for some first amount of time, the decoder 202 produces decoded frames of a first size, and for some second amount of time, the decoder 202 produces encoder reference frames of a second size.

Because the same decoder 202 is used to produce the decoded frame 210 and the encoder reference frame 218, the total cost, size and power consumption of the streamlined transcoder architecture is improved compared to conventional transcoders. Advantageously, the software, hardware, and/or integrated circuitry comprising the decoder 202 can be reused, providing a more efficient transcoder architecture.

Figure 3:
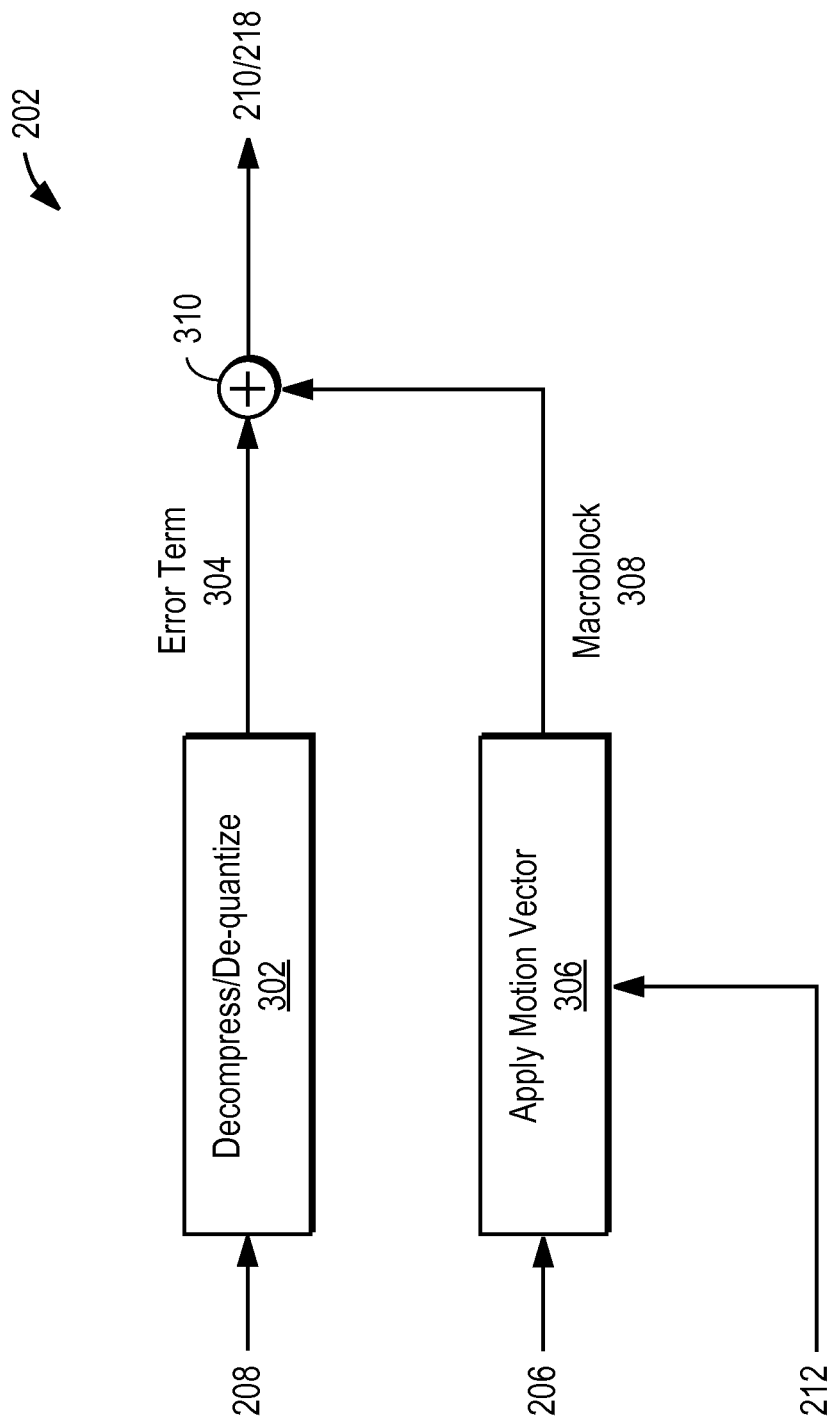
FIG. 3 illustrates a method for decoding a frame of video, according to one embodiment of the present invention.

FIG. 3 illustrates an interprediction method for decoding a frame of video, according to one embodiment of the present invention. In one embodiment, the method is performed by the decoder 202. Note the decoder 202 can also perform an intraprediction method which is not shown.

The decoder 202 receives a reference frame 212. The reference frame 212 can be decoded from the input stream 201, or it can be decoded from the output of the encoder 204. For example, the reference frame 212 can be a decoded frame 210 or a encoder reference frame 218. Reference frame 212 is a frame of video without interframe compression.

The decoder 202 also receives motion vectors 206. The motion vectors can be received from the input stream 201 or the output of the encoder 204 (for example, from the output stream 220). The motion vectors 206 describe, generally in a spatial domain, how macroblocks from one frame are related to macroblocks of a previous or subsequent frame. As an optimization, the encoder 204 can, instead of sending the motion vectors 206 directly, send the motion compensated pixels from the encoder reference frame to save memory bandwidth and calculation.

In one embodiment, the decoder 202 applies 306 the motion vectors 206 and macroblock type/mode to the reference frame 212 for interframe predicted macroblocks. The motion vectors 206 can be applied 306 to the reference frame in a spatial or a compressed domain. The application 306 of the motion vectors 206 to the reference frame 212 produces a macroblock 308.

The decoder 202 receives a transformed and quantized residual or error term 208 and dequantization term. The error term 304 describes how the macroblock 308 should be modified to improve the fidelity of the resulting frame and the dequantization term describes how the error term 304 is reconstructed from 208. For example, the error term 208 may include information related to transients not encoded in the motion vector 206. The error term 208 and dequantization term can be described in a spatial or compressed domain.

In one embodiment, the decoder 202 decompresses 302 the error term 208 to produce an error term 304. For example, according to various standards, the error term can be encoded using various lossy and/or lossless compression techniques. In one embodiment, decompressing 302 the error term 208 can include transforming the error term 208 from a compressed to a spatial domain, for example, by applying a transformation derived from an Inverse Discrete Cosine Transform. In one embodiment, the decoder 202 dequantizes 302 the error term to produce the error term 304. The decompression and/or dequantization 302 performed by the decoded 202 can depend on the format of the input/output stream processed by the decoder 202.

The decoder 202 adds 310 the error term 304 to the macroblock 308 to produce a encoder reference frame 218 or a decoded frame 210. Both the encoder reference frame 218 and the decoded frame 210 can be in a spatial or a compressed domain, and typically do not include interframe compression.

As described herein with reference to FIG. 2, the same decoder 202 is used to produce the decoded frame 210 and the encoder reference frame 218. In one embodiment, the method of the decoder can be understood as operating in one of at least two modes. In a first mode, frame information including motion vectors 206 and an error term 208 are received from an input stream 201, and a reference frame 212 is received from a previous or future decoded frame 210. In one embodiment the frame information further comprises a variety of the compression parameters such as quantization, macroblock type/mode, etc. In the first mode, the output of the decoder 202 is a decoded frame 210. The inputs, output, and steps of the first mode are typically consistent with the format of the input stream 201. For example, the error term 208 may be given in a specific range, the motion vectors may be described in a particular format, and/or the decoded frame 210 may be of a certain size. Furthermore, decompression/dequantization 302, motion vector application 306, and addition 310 steps may be performed according to a format associated with the input stream 201.

In the second mode, the frame information including a motion vector 206, and an error term 208 is received from the output of the encoder 204, and a reference frame 212 is received from a previous or future encoder reference frame 218. The frame information received from the encoder 204 may also include and a variety of the compression parameters such as quantization, macroblock type/mode, etc. In the second mode, the output of the decoder 202 is a encoder reference frame 218. The inputs, output, and steps of the second mode are typically consistent with the format of the output stream 220. For example, the error term 208 may be given in a specific range, the motion vectors may be described in a particular format, and/or the decoded frame 210 may be of a certain size. The range, format, and/or size of parameters such as the error term 208, the motion vectors 206, and the reference frame 212 can be different when the decoder 202 is operating in the first mode versus when the decoder 202 is operating in the second mode. Furthermore, decompression/dequantization 302, motion vector application 306, and addition 310 steps may be performed according to a format associated with the output stream 220. Therefore, decoding can be performed differently when the decoder is in the first mode versus the second mode.

An efficient implementation of steps such as those illustrated in FIG. 2, such as decompression/dequantization 302, motion vector application 306, and addition 310, can involve dedicated hardware, software, and/or integrated circuitry specialized for the performance of the various steps. For example, when the system is implemented in hardware, it is common for the decompression 302 step to make use of a dedicated device such as an Inverse discrete cosine Transform module. As the decoder 202 is used for dual purposes (i.e. the production of both decoded 210 and encoder reference 218 frames), a system according to an embodiment of the present invention advantageously provides efficient use of any such dedicated hardware, software and/or integrated circuitry.

Figure 4:
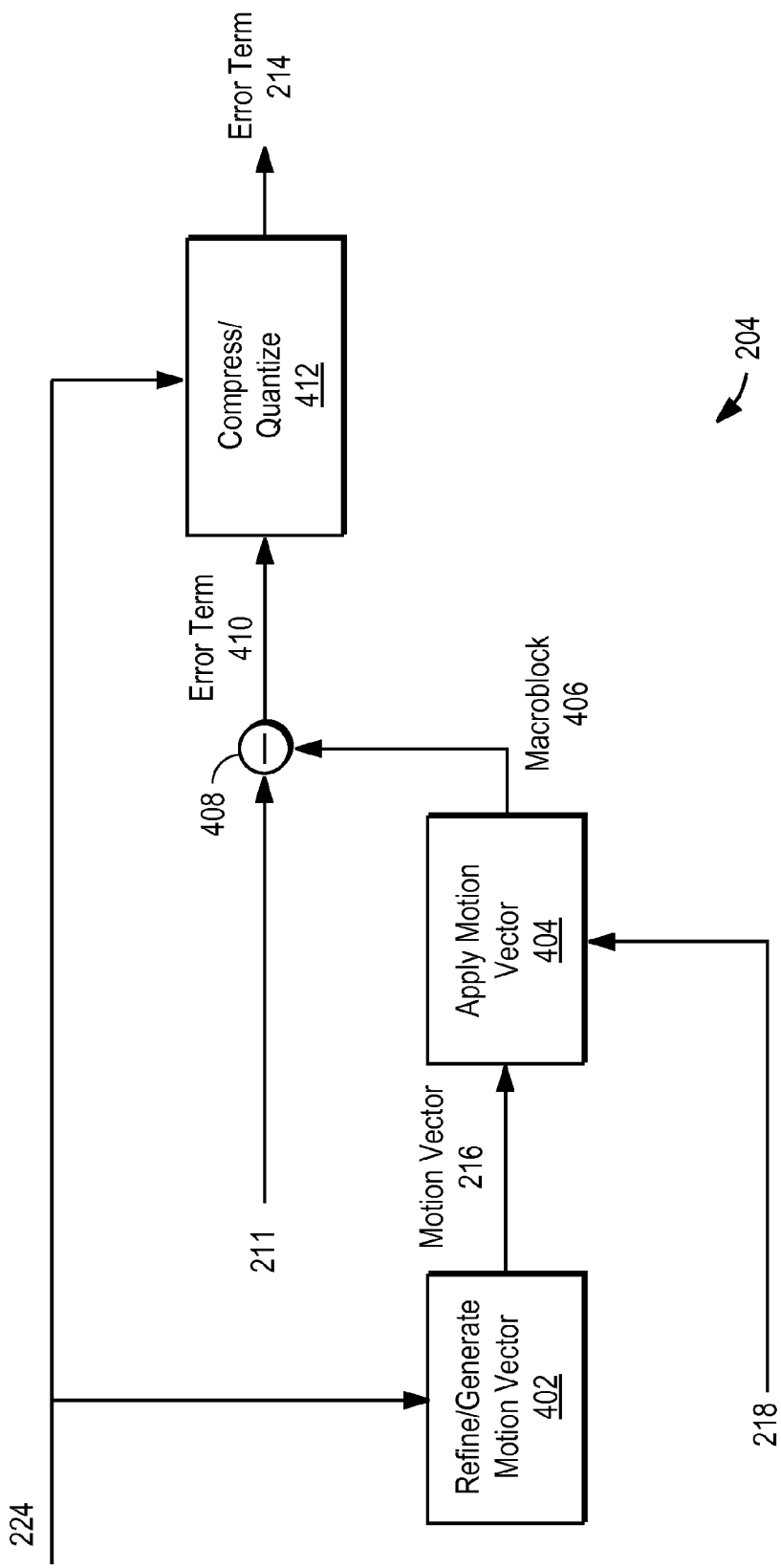
FIG. 4 illustrates a method for encoding a frame of video, according to one embodiment of the present invention.

FIG. 4 illustrates a method for encoding a frame of video, according to one embodiment of the present invention. In one embodiment of the present invention, the method is performed by the encoder 204.

The encoder receives a decoded frame 211 and an encoder reference frame 218. In one embodiment, the decoded frame 211 is the output of an image processor 213. In another embodiment, the decoded frame 211 is the output of the decoder 202 operating in a first mode. The encoder reference frame 218 is typically the output of the decoder 202 operating in a second mode.

In one embodiment, the encoder 204 generates 402 using motion vectors and macroblock type/mode and other parameters 224 passed from decoder 202, one or more motion vectors 216 and the macroblock type/mode. The encoder 204 can generate 402 motion vectors 216, for example, by comparing the decoded frame 211 to the encoder reference frame 218. The encoder 204 attempts to generate 402 motion vectors 216 that describe the changes between the encoder reference frame 218 and the decoded frame 211. In another embodiment, the encoder 204 refines 402 motion vectors received from the input stream 201. Because the decoded frame 211 will often be similar to the decoded frame 210, the motion vectors from the input stream 201 can increase the efficiency and effectiveness of the generation of motion vectors for the output stream 220. Reusing the motion vectors from the input stream 201 beneficially reduces the computation involved in transcoding.

In one embodiment, the encoder 204 applies 404 the motion vectors 216 to the encoder reference frame 218 to produce a macroblock 406. In another embodiment, the encoder generates/refines 402 and applies 404 the motion vector in a unified step to produce a macroblock 406. By combining the generation and application steps of motion vectors, the efficiency of the encoder 204 can be advantageously improved.

The encoder 204 subtracts 408 the macroblock 406 from the decoded frame 211 to produce an error term 410. The encoder 204 compresses/quantizes 412 the error term 410 to produce an error term 214. In one embodiment, parameters 224 passed from the decoder are used in compressing/quantizing 412 the error term 410. The motion vectors 216 and the error term 214 are components of the output stream 220. Furthermore, as illustrated in FIG. 2, the motion vectors 216 and the error term 214 are fed back to the decoder 202, advantageously facilitating reuse of the decoder implementation.

If the reference frame used motion compensation, one optimization is to pass the motion-compensated reference frame pixel data or Macroblock 406 instead of the motion vectors 216 from the encode 204 to the decoder 202. This saves the bandwidth of another motion compensation fetch.

Another optimization is to pass the output of the encoder one macroblock at a time directly to the input of the decoder without storing the results to memory for non-reference frames to dramatically boost the transcoder performance.

For the purposes of illustration, both the input stream 201 and the output stream 220 are discussed as being of generalized forms common among a variety of compression formats. The methods described herein are useful for a variety of compression formats, some of which may differ from the generalized format described herein for the purposes of illustration. It will be apparent to one of skill in the art that the techniques may be applied to various compression formats without departing from the scope of the present invention.

Further, for the purposes of illustration, the methods and systems are described in terms of video or image frames. It will be apparent to one of skill in the art that the techniques may also be applied to video or image fields without departing from the scope of the present invention. Further, according to various embodiments, the video or image frames or fields may be interlaced or deinterlaced.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention. For example, the systems and methods of the present invention can be used to establish a connection between a client computer and a server computer using any type of stateless protocol.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for transcoding a video stream, the method comprising:
   receiving a first frame information at an input device;
   sending the first frame information from the input device to a decoder;
   decoding, in the decoder in a first mode of operation, a first decoded frame from the first frame information received from the input device;
   comparing, in an encoder, a second decoded frame and a first encoder reference frame to produce a second frame information;
   outputting the second frame information from the encoder;
   sending the second frame information from the encoder to the same decoder; and
   decoding, in the same decoder in a second mode of operation, a second encoder reference frame from the second frame information that is received from the encoder.

2. The method of claim 1, wherein the first frame information comprises a frame with interframe compression.

3. A method for transcoding a video stream, the method comprising:
   receiving a first field information at an input device;
   sending the first field information from the input device to a decoder;
   decoding, in the decoder in a first mode of operation, a first decoded field from the first field information received from the input device;
   comparing, in an encoder, a second decoded field and a first encoder reference field to produce a second field information;
   outputting the second field information from the encoder;
   sending the second field information from the encoder to the same decoder; and
   decoding, in the same decoder in a second mode of operation, a second encoder reference field from the second field information that is received from the encoder.

4. The method of claim 3, wherein the first field information comprises a field with interfield compression.

5. A method for transcoding a video stream, the method comprising:
   sending first frame information in an input stream from a first multiplexer to a decoder at first times;
   decoding, in the decoder, the received first frame information to generate a decoded frame;
   sending the decoded frame from the decoder to an encoder via a demultiplexer;
   comparing, in the encoder, the received decoded frame and an encoder reference frame to generate second frame information;
   sending the second frame information from the encoder to the decoder via the first multiplexer at second times;
   decoding, in the decoder, the second frame information to generate an encoder reference frame; and
   sending the encoder reference frame from the decoder to the encoder via the demultiplexer.

6. The method of claim 5, wherein the first frame information comprises a motion vector and an error term.

7. The method of claim 5, wherein the decoded frame is transformed at an image processor before being received by the encoder.

8. The method of claim 5, further comprising:
   generating an output stream including the second frame information.

9. The method of claim 5, further comprising:
   receiving the decoded frame at a second multiplexer from a reference frame storage;
   sending the decoded frame from the second multiplexer to the decoder at the first times to be used as a reference frame in the decoder.

10. The method of claim 5, further comprising:
    receiving the encoder reference frame at a second multiplexer from a reference frame storage;
    sending the encoder reference frame from the second multiplexer to the decoder at the second times to be used as a reference frame in the decoder.

11. The method of claim 5, further comprising sending compression parameters from the decoder to the encoder to generate the second frame information.

12. The method of claim 11, wherein the compression parameters comprise at least one of motion vectors, macroblock type data, and macroblock mode data.

13. The method of claim 5, wherein the first frame information comprises a frame with interframe compression.

14. A system for transcoding a video stream, the system comprising:
    a first multiplexer, comprising:
       a first input, configured to receive first frame information in an input stream,
       a second input, configured to receive second frame information from an encoder,
       an output, configured to send a selected frame information to a decoder, the selected frame information comprising the first frame information at first times and comprising the second frame information at second times;
    the decoder, configured to decode a decoded frame from the selected frame information;

a demultiplexer, comprising:
  an input, configured to receive the decoded frame from the decoder,
  a first output, configured to send the decoded frame to the encoder at the first times,
  a second output, configured to send the decoded frame as an encoder reference frame to the encoder at the second times, and
the encoder, configured to:
  compare the decoded frame and the encoder reference frame to produce a second frame information, and
  send the second frame information to the second input of the first multiplexer.

15. The system of claim 14, further comprising:
an image processing device, configured to transform the decoded frame before being received at the encoder.

16. The system of claim 14, further comprising:
an output device, configured to generate an output stream including the second frame information.

17. The system of claim 14, further comprising a second multiplexer, the second multiplexer comprising:
  a first input, configured to receive the decoded frame from a reference frame storage;
  a second input, configured to receive the encoder reference frame from the reference frame storage; and
  an output, configured to send a reference frame to the decoder, the reference frame comprising the first decoded frame at the first times and comprising the encoder reference frame at the second times.

18. The system of claim 14, wherein the decoder is further configured to send compression parameters to the encoder, and wherein the encoder is further configured to use the compression parameters to generate the second frame information.

19. The system of claim 18, wherein the compression parameters comprise at least one of motion vectors, macroblock type data, and macroblock mode data.

20. The system of claim 14, wherein the first frame information represents a frame with interframe compression.

* * * * *